Patented Feb. 12, 1929.

1,702,022

UNITED STATES PATENT OFFICE.

ROBERT EMANUEL SCHMIDT AND WILLY TRAUTNER, OF ELBERFELD, GERMANY, ASSIGNORS TO GRASSELLI DYESTUFF CORPORATION, OF NEW YORK, N. Y., A CORPORATION OF DELAWARE.

ALPHA-DI(METHYLAMINO)-ALPHA-DIHYDROXY-ANTHRAQUINONE DISULPHONIC ACIDS AND PROCESS OF MAKING THE SAME.

No Drawing. Application filed April 13, 1926, Serial No. 101,781, and in Germany April 17, 1925.

We have found new and useful improvements in alpha-di(methylamino)-alpha-dihydroxy-anthraquinone disulphonic acids and in processes of making the same, of which the following is a specification.

We have found that by acting with relatively small amounts of formaldehyde in neutral solution upon alpha-diamino-alpha-dihydroxy-anthraquinone disulphonic acids a methyl group is introduced into each amino group to form substantially homogeneous alpha-(dimethylamino)-alpha-dihydroxy-anthraquinone disulphonic acids.

The action of formaldehyde upon alpha-amino-anthraquinone compounds under various conditions has been several times investigated and described in patents; the processes so described and the products obtained are, however, essentially different from my present invention.

The German Patent 112,115 describes blue dyestuffs which are obtained when formaldehyde and sulphurous acid are allowed to react upon 4-8-diamino-1-5-dihydroxy-anthraquinone-2-6-disulphonic acid or respectively upon 4-5-diamino-1-8-dihydroxy-anthraquinone-2-7-disulphonic acid. These dyestuffs contain the methane sulphonic acid radicle

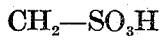

linked to the amino group. According to a more recent conception the products are, however, isomeric sulphurous acid esters of the formula

(compare Berichte 1926, volume 1, page 859 ff., volume 2, pages 20-25 ff.; Annalen der Chemie, volume 448, p. 265 ff. and Raschig, Schwefelund Stickstoffstudien, 1924, page 242 ff.). When heated with mineral acid, particularly hydrochloric acid, these esters are decomposed and the corresponding diamino-antharaufin disulphonic acid, or respectively diaminochrysazine-disulphonic acid is recovered.

In German Patent 123,745 a process is described in which formaldehyde in neutral alcoholic solution or in solution of other organic solvents reacts upon alpha-diamino-anthraquinones. The products are described as condensation products and by heating under pressure with concentrated hydrochloric acid the original diaminoanthraquinones are recovered. No constitutional formula of these products is given, nor is an attempt made to explain their chemical character.

The preparation of methyl-amino-anthraquinone has been described in the German Patent 156,056; it consists in acting with an excess (in proportion of about 24 mols of formaldehyde in the case of a diamino anthraquinone and of about 45 mols of formaldehyde in the case of a mono-amino-anthraquinone for each amino group) of formaldehyde upon amino-anthraquinones dissolved in concentrated mineral acid. From the single example given, which is directed to the preparation of the alphamono-methyl-amino-anthraquinone, it is apparent that the reaction is not a simple one, inasmuch as at least two products are formed and isolated.

Our new process consists in heating in a neutral medium alpha-diamino-dihydroxy-anthraquinone disulphonic acids with formaldehyde in the proportion of about 2½ mols of formaldehyde for each amino group. The reaction products obtained are according to elementary analysis and chemical behavior the N-methyl derivatives of the diamino-dihydroxy-anthraquinone disulphonic acids. These substances are therefore of a different class than those described in the German Patents 112,115 and 123,745 mentioned above. The reaction leading to the methyl-amino-anthraquinones as disclosed in the German Patent 156,056 is not a simple one and gives quite unsatisfactory yields of the methyl-amino-anthraquinones.

It could therefore hardly be expected that the much more complicated diamino-dihydroxy-anthraquinone disulphonic acids would be methylated in such an easy manner with the much simpler procedure of our present invention.

Our new process is particularly suited for the preparation of 4-8-di(methylamino)-1-5-dihydroxy-anthraquinone-2-6-disulphonic acid but p-diamino-anthrarufin-3-7-disulphonic acid as well as p-diamino-chrysazine-disulphonic acids will react in quite the same way to produce the new substantially homogeneous, corresponding N-methyl compounds.

Our new substantially homogeneous alpha-di(methylamino)-alpha-dihydroxy-anthraquinone disulphonic acids are dark blue powders; they are better soluble in water,—and their solutions are of a greener blue,—than the corresponding not methylated compounds. Addition of moderate amounts of mineral acid to these aqueous solutions does not change their colors, in contradistinction with solutions of the non-methylated compounds. Their solution in concentrated sulphonic acid is yellow and in the anthrarufin series turns blue on addition of boric acid. Unmordanted wool is dyed therewith from acid baths beautiful blue shades. The new methylated products are stable against heating with hydrochloric acid.

Our invention is further illustrated by the following example, the parts being by weight:

*Example.*—40 parts of p-diamino-anthrarufin-2-6-disulphonic acid of the formula—

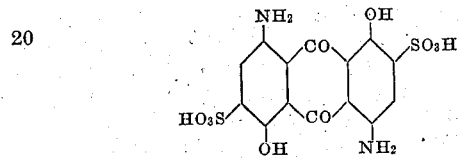

are suspended in 200 parts of water and 33 parts of 40% formaldehyde solution and, with good stirring, heated to 95° C. The p-diamino-anthrarufin-disulphonic acid dissolves gradually with a greenish-blue color. The raw material gives in boric-sulphuric acid solution a well known, characteristic absorption spectrum. The reaction with formaldehyde can be followed by pouring samples of the reaction mass into boric-sulphuric acid and observing the absorption spectrum. It shifts gradually towards the red end of the spectrum. After the absorption spectrum does not change any more and all of the p-diamino-anthrarufin disulphonic acid is dissolved, which occurs after about 1½ hours heating, 240 parts of concentrated (36%) hydrochloric acid are added. The new compound separates as a crystalline powder, which is filtered off, washed with 20% hydrochloric acid, then with absolute alcohol and dried.

It appears under the microscope as light olive colored crystals. It is better soluble in water than the starting material, with a more greenish-blue color. This color, in contradistinction with solutions of the original p-diamino-anthrarufin disulphonic acid, is not modified by the addition of moderate amounts of mineral acids. The new substance dissolves in concentrated sulphuric acid with a yellow color which on addition of boric acid turns greenish-blue and displays an absorption spectrum similar to that of boric-sulphuric acid solutions of the original material, but it is considerably shifted towards the red end of the spectrum. Unmordanted wool, in an acid bath, is dyed therewith beautiful blue shades.

If potassium chloride is added to a hot aqueous solution of the new substance a dipotassium salt is salted out. Elementary analysis shows it to have the formula:

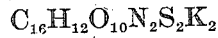

and its most probable constitutional formula is:

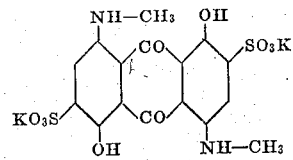

The analysis has given the following results:

$C_{16}H_{12}O_{10}N_2S_2K_2$

| | Calculated. | Found. | |
|---|---|---|---|
| C: | 35.94% | 35.88 | 35.58% |
| H: | 2.26% | 2.52 | 2.58% |
| K: | 14.63% | 14.54% | |

The reaction product is therefore most probably the 4-8-di(methylamino)-1-5-dihydroxy-2-6-disulphonic acid.

From 100 parts of p-diamino-anthrarufin-disulphonic acid a yield of 90–98 parts quite pure crystallized p-di(methylamino)-anthrarufin-disulphonic acid can be obtained directly.

We claim:

1. Process which comprises treating one molecular proportion of an alpha-diamino-alpha-dihydroxy-anthraquinone disulphonic acid, in substantially neutral aqueous suspension, with about five molecular proportions of formaldehyde.

2. Process which comprises treating one molecular proportion of 4.8-diamino-1.5-dihydroxy-anthraquinone-2.6-disulphonic acid, in substantially neutral aqueous suspension with about 5 molecular proportions of formaldehyde.

In testimony whereof we have hereunto set our hands.

ROBERT EMANUEL SCHMIDT.
WILLY TRAUTNER.

CERTIFICATE OF CORRECTION.

Patent No. 1,702,022.                           Granted February 12, 1929, to

ROBERT EMANUEL SCHMIDT ET AL.

It is hereby certified that error appears in the printed specification of the above numbered patent requiring correction as follows: Page 2, line 8, for the word "sulphonic" read "sulfuric"; and that the said Letters Patent should be read with this correction therein that the same may conform to the record of the case in the Patent Office.

Signed and sealed this 26th day of March, A. D. 1929.

(Seal)
M. J. Moore,
Acting Commissioner of Patents.